United States Patent
Kim et al.

(10) Patent No.: US 11,811,711 B2
(45) Date of Patent: Nov. 7, 2023

(54) METHOD, APPARATUS, SYSTEM, AND NON-TRANSITORY COMPUTER READABLE MEDIUM FOR CONTROLLING USER ACCESS THROUGH CONTENT ANALYSIS OF AN APPLICATION

(71) Applicant: LINE Plus Corporation, Seongnam-si (KR)

(72) Inventors: Jong Min Kim, Seongnam-si (KR); Ji Hyeon Park, Seongnam-si (KR); Hyukjae Jang, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 325 days.

(21) Appl. No.: 16/460,041

(22) Filed: Jul. 2, 2019

(65) Prior Publication Data
US 2020/0036831 A1    Jan. 30, 2020

(30) Foreign Application Priority Data

Jul. 24, 2018 (KR) .................. 10-2018-0085827

(51) Int. Cl.
| | |
|---|---|
| H04L 51/043 | (2022.01) |
| G06F 3/04817 | (2022.01) |
| H04L 67/306 | (2022.01) |
| G06F 3/0484 | (2022.01) |
| G06F 40/30 | (2020.01) |
| G06F 40/242 | (2020.01) |

(Continued)

(52) U.S. Cl.
CPC .......... *H04L 51/043* (2013.01); *G06F 3/0484* (2013.01); *G06F 3/04817* (2013.01); *G06F 40/242* (2020.01); *G06F 40/30* (2020.01); *H04L 51/52* (2022.05); *H04L 67/306* (2013.01); *H04M 1/72436* (2021.01); *H04M 1/72463* (2021.01)

(58) Field of Classification Search
CPC .. H04M 1/72577; H04L 51/043; H04L 51/32; G06F 3/04817

See application file for complete search history.

(56) References Cited

U.S. PATENT DOCUMENTS

| | | | | |
|---|---|---|---|---|
| 7,720,853 | B1 * | 5/2010 | Siegel | ................... G06Q 50/01 |
| | | | | 707/754 |
| 2008/0307320 | A1 * | 12/2008 | Payne | .................. G06F 3/0481 |
| | | | | 715/751 |

(Continued)

FOREIGN PATENT DOCUMENTS

| | | |
|---|---|---|
| KR | 10-2002-0074304 A | 9/2002 |
| KR | 10-2014-0120506 A | 10/2014 |

(Continued)

*Primary Examiner* — William L Bashore
*Assistant Examiner* — Gregory A Distefano
(74) *Attorney, Agent, or Firm* — Harness, Dickey & Pierce, P.L.C.

(57) ABSTRACT

A method, apparatus, system, and non-transitory computer readable medium for controlling user access through content analysis of an application are disclosed. The method for controlling access may include understanding a public level according to honorific language use by analyzing chat contents for each chat partner registered in an application, by the at least one processor; and controlling user access to the application based on the public level for each chat partner, by the at least one processor.

18 Claims, 11 Drawing Sheets

(51) Int. Cl.
*H04M 1/72436* (2021.01)
*H04L 51/52* (2022.01)
*H04M 1/72463* (2021.01)

(56) References Cited

U.S. PATENT DOCUMENTS

| | | | |
|---|---|---|---|
| 2010/0174813 A1* | 7/2010 | Hildreth | H04L 51/34 |
| | | | 709/224 |
| 2010/0205541 A1* | 8/2010 | Rapaport | G06F 16/285 |
| | | | 715/753 |
| 2011/0258656 A1* | 10/2011 | Michel | H04N 21/4307 |
| | | | 725/27 |
| 2016/0337364 A1* | 11/2016 | Grankovskyi | G06Q 10/00 |
| 2016/0371791 A1* | 12/2016 | Lee | H04W 4/21 |
| 2017/0041263 A1* | 2/2017 | Shekel | H04L 63/0414 |
| 2017/0171121 A1* | 6/2017 | Zhang | H04L 67/75 |
| 2017/0324696 A1* | 11/2017 | Akselrod | H04L 51/32 |

FOREIGN PATENT DOCUMENTS

| | | |
|---|---|---|
| KR | 10-2016-0027491 A | 3/2016 |
| KR | 10-2016-0149607 A | 12/2016 |
| KR | 10-1683819 B1 | 12/2016 |
| KR | 10-2018-0060971 A | 6/2018 |

* cited by examiner

METHOD, APPARATUS, SYSTEM, AND NON-TRANSITORY COMPUTER READABLE MEDIUM FOR CONTROLLING USER ACCESS THROUGH CONTENT ANALYSIS OF AN APPLICATION

This U.S. non-provisional application claims the benefit of priority under 35 U.S.C. § 119 to Korean Patent Application No. 10-2018-0085827, filed on Jul. 24, 2018, in the Korean Intellectual Property Office, the disclosure of which is incorporated herein by reference in its entirety.

BACKGROUND

Field

Various example embodiments relate to technology for reducing input mistakes in an application.

Description of Related Art

An instant messenger is a general communication tool software which may transmit and receive messages or data in real-time, and a user may register a chat partner in the messenger, may select the chat partner from a chat partner list of the messenger, and send and receive messages in real-time with the selected chat partner.

Such messenger function makes the use of the messenger common in not only a PC environment, but also a mobile environment of a mobile communication terminal.

For example, a service system and method for mobile messenger of mobile phone using wireless communication network may provide a messenger service between mobile messengers installed in mobile terminals.

SUMMARY

At least one example embodiment may reduce input mistakes in an application (e.g., a chat application and/or a chat room, etc.) by controlling a user's access and/or controlling a user input through content analysis of the content previously input into the application and/or the user input itself.

A method executed in a computer system comprises at least one processor configured to execute computer readable instructions included in a memory, and the method comprises receiving, using the at least one processor, chat contents related to a plurality of chat rooms in a chat application; analyzing, using the at least one processor, the chat contents corresponding to a plurality of users registered in the chat application, the analyzing including determining a user public level score for each user participating in a chat room of a plurality of chat rooms of the chat application based on honorific language used by the user in the chat content; and controlling, using the at least one processor, user access of a graphical user interface (GUI) of the chat application based on the determined public level score for each user, the controlling including modifying a GUI corresponding to each of the plurality of chat rooms based on the determined user public level score for each user of each chat room of the plurality of chat rooms.

According to an aspect of at least one example embodiment, the analyzing comprises extracting honorific language from the chat contents of each of the plurality of chat rooms using a dictionary database, the dictionary database including an honorific language corpus, or honorific expressions determined based on big data analysis of a plurality of documents.

According to another aspect of at least one example embodiment, the analyzing may comprise acquiring a social graph related to the chat application, the social graph including a plurality of users of the chat application, the plurality of users including users without chat contents; and predicting a public level of a corresponding chat partner of at least one chat room of the plurality of chat rooms based on relation analysis of the social graph.

According to another aspect of at least one example embodiment, the method may further comprise determining, using the at least one processor, a public level of each chat room of the plurality of chat rooms using a public level of the users included in each of the chat rooms.

According to another aspect of at least one example embodiment, the method may further comprise calculating, using the at least one processor, a confidence score based on the user public level score of at least one user of the chat room based on a number of total chat messages and chat frequency for each of the at least one user of the chat room; and the determining the public level for each chat room includes determining the public level for each chat room based on a public level of at least one user in the chat room whose confidence score is above a desired threshold among the users in the chat room, or by assigning weights according to the confidence score for the public level of the at least one user in the chat room.

According to another aspect of at least one example embodiment, the controlling may comprise sorting a chat partner list or generating a chat partner group based on the user public level score for each user.

According to another aspect of at least one example embodiment, the controlling may comprise automatically setting a deactivating lock on an input tool of the GUI of the chat room based on the public level of the chat room.

According to another aspect of at least one example embodiment, the controlling may comprise overlaying an inactivation window on an input tool of the GUI of the chat room based on the public level of the chat room, the inactivation window deactivating the input tool; and displaying guidance information on the inactivation window, the guidance information related to a public relation of the users of the chat room.

According to another aspect of at least one example embodiment, the controlling may comprise highlighting or autocorrecting words input in the GUI of the chat room based on the public level of the chat room.

According to another aspect of at least one example embodiment, the controlling may comprise receiving a user input corresponding to a content share operation; and displaying a notification regarding contents to be shared by the content share operation based on the public level of the chat room.

According to another aspect of at least one example embodiment, the controlling may comprise recommending an emoticon or a sticker corresponding to the public level of the chat room through the GUI of the chat room.

According to another aspect of at least one example embodiment, the controlling may comprise determining a public level change score between a public level of a current chat room of a user and a public level of a previous chat room of the user; and displaying a notification to the current chat room in response to the public level score change being above a desired change level score when displaying the current chat room.

According to another aspect of at least one example embodiment, the controlling may comprise displaying different display elements corresponding to the chat room based on the public level of the chat room.

According to another aspect of at least one example embodiment, the controlling may comprise sorting a chat room list, or grouping and displaying the plurality of chat rooms based on the public level of the plurality of chat rooms.

According to another aspect of at least one example embodiment, the controlling may comprise displaying a shared object list GUI in the GUI of the chat application, the displaying the shared object list GUI including separating a user or a chat room included in the shared object list based on the public level of the user or the public level of the chat room, the shared object list GUI including objects to be shared between the chat application and a second application.

According to another aspect of at least one example embodiment, the method may further comprise analyzing, using the at least one processor, the chat contents of the at least one chat room of the plurality of chat rooms; extracting, using the at least one processor, at least one main subject of the at least one chat room based on the analyzing the chat contents of the at least one chat room; and analyzing, using the at least one processor, chat content input by the user into the chat room GUI, wherein the controlling comprises displaying a notification on the chat room GUI based on the extracted at least one main subject of the chat room and results of the analyzing the chat contents input by the user.

According to another aspect of at least one example embodiment, the analyzing may comprise extracting honorific title endings or honorific title nouns in the chat contents as honorific language; calculating a frequency of the honorific language extracted from the chat contents; calculating an importance score of the extracted honorific language in relation to the extracted honorific language use in a sentence; and calculating a public score of the chat contents based on the calculated frequency of the honorific language and the calculated importance score.

According to another aspect of at least one example embodiment, calculating the public score based on at least one of average sentence length of the chat contents, frequency of use of nonstandard language of the chat contents, completion of sentence structure of the chat contents, or combinations thereof.

According to another aspect of at least one example embodiment, the calculating the public score comprises calculating the public score based on weights assigned to a contact group name in which the user is included, short range communication with the user, and contents shared with the user.

A computer system comprising a memory; and at least one processor which is connected with the memory, and configured to execute computer readable instructions to, receive chat contents related to a plurality of chat rooms in a chat application, analyze the chat contents corresponding to each user of a plurality of users registered in the chat application, the analyzing including determining a user public level score for each user participating in a chat room of a plurality of chat rooms of the chat application based on honorific language used by the user in the chat content, and determining a chat room public level score for each chat room of the plurality of chat rooms based on the determined user public level scores of the chat room; and control user access of a graphical user interface (GUI) for each of the chat rooms based on the determined chat room public level score for the chat room, the controlling including modifying the GUI corresponding to each of the plurality of chat rooms.

BRIEF DESCRIPTION OF THE DRAWINGS

These and/or other aspects, features, and advantages of the example embodiments will become apparent and more readily appreciated from the following description of various example embodiments, taken in conjunction with the accompanying drawings of which.

DETAILED DESCRIPTION

Hereinafter, some example embodiments will be described in detail with reference to the accompanying drawings.

At least one example embodiment relates to technology for reducing input mistakes in an application.

One or more example embodiments may reduce input mistakes (e.g., user input mistakes, etc.) in an application (e.g., software application, etc.) by controlling user access through content analysis of the application, and through this, significant advantages may be achieved in terms of efficiency, service quality, convenience, and the like.

Figure 1:
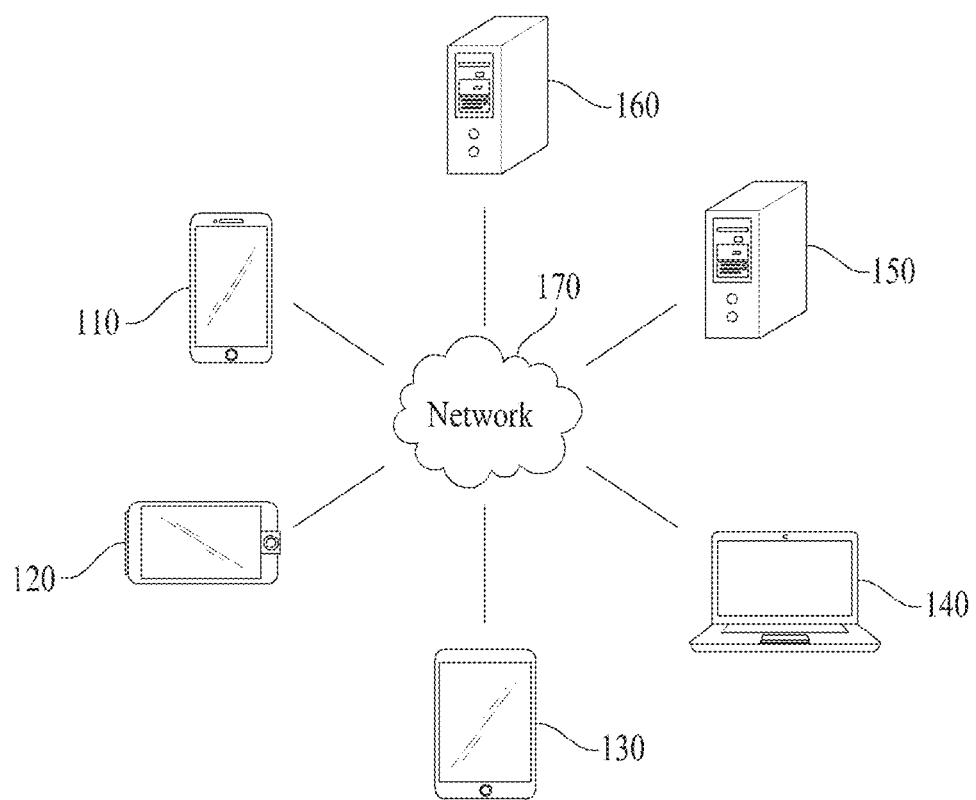
FIG. 1 illustrates an example of a network environment according to at least one example embodiment.

FIG. 1 illustrates an example of a network environment according to at least one example embodiment. The network environment of FIG. 1 indicates an example including a plurality of electronic devices 110, 120, 130, 140, a plurality of servers 150, 160, and a network 170. FIG. 1 illustrates at least one example embodiment, but the example embodiments are not limited thereto, and for example, the number of electronic devices and servers may differ from what is show in FIG. 1, and the system may also include other components as well.

The plurality of electronic devices 110, 120, 130, 140 may be fixed terminals or mobile terminals. As an example of the electronic devices 110, 120, 130, 140, there are a smart phone, a mobile phone, a navigation device, a computer, a laptop, a digital broadcasting terminal, a PDA (Personal Digital Assistants), a PMP (Portable Multimedia Player), a tablet device, a game console, a wearable device, an IoT (Internet of Things) device, a VR (virtual reality) device, an AR (augmented reality) device, and the like. As an example, FIG. 1 indicates a form of a smart phone as an example of the electronic device 110, but in the example embodiments, the electronic device 110 may actually be one of various physical computer systems which may communicate with other electronic devices 120, 130, 140, etc., and/or the servers 150, 160, etc., through the network 170 by using a wireless and/or wired communication method.

The communication method is not limited, and it may include not only a communication method using at least one network, e.g., network 170 which may include a mobile communication network, the wired Internet, the wireless Internet, a broadcasting network, a satellite network, and the like, but also short-range wireless communication. For example, the network 170 may include any at least one of a PAN (personal area network), a LAN (local area network), a CAN (campus area network), a MAN (metropolitan area network), a WAN (wide area network), a BBN (broadband network), the Internet, and the like. Also, the network 170 may include any one or more among network topologies including bus network, star network, ring network, mesh network, star-bus network, tree or hierarchical network, and the like, but it is not limited thereto.

Each of the servers 150, 160 may be implemented as a computer device, or a plurality of computer devices, and may provide an instruction (e.g., computer readable instruction), a code, a file, a content, a service, and the like, by communicating with the plurality of electronic devices 110, 120, 130, 140 through the network 170. For example, the server 150 may be a system providing a first service to the plurality of electronic devices 110, 120, 130, 140 connected through the network 170, and the server 160 also may be a computer system providing a second service to the plurality of electronic devices 110, 120, 130, 140 connected through the network 170. As more particular example, the server 150 may provide a service (e.g. a messenger service and the like) which a corresponding application is intended for to the plurality of electronic devices 110, 120, 130, 140 as the first service through the application as a computer program installed and run in the plurality of electronic devices 110, 120, 130, 140, but the example embodiments are not limited thereto. As another example, the server 160 may provide a service for distributing files for the above described application installation and running to the plurality of electronic devices 110, 120, 130, 140 as the second service, etc.

Figure 2:
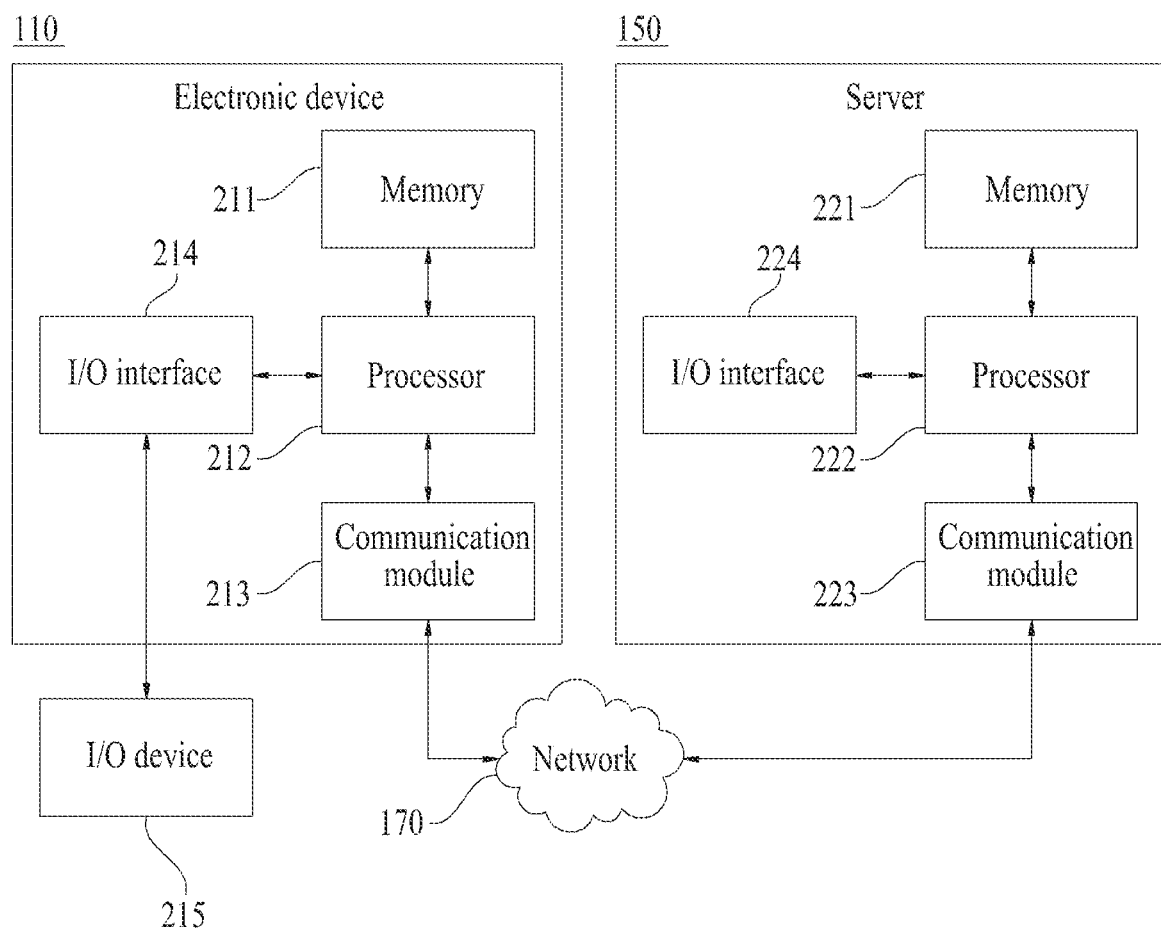
FIG. 2 is a block diagram illustrating example internal configurations of an electronic device and a server according to at least one example embodiment.

FIG. 2 is a block diagram illustrating internal configuration of an electronic device and a server according to at least one example embodiment. The internal configuration of the electronic device 110 and the server 150 is described in FIG. 2 as an example of an electronic device, however the example embodiments are not limited thereto. Also, other electronic devices 120, 130, 140 or the server 160 also may have internal configuration same with or similar to the above described electronic device 110 or the server 150.

The electronic device 110 and the server 150 may include memories 211, 221, processors 212, 222, communication modules 213, 223, and input/output interfaces 214, 224. The memories 211, 221 which are non-transitory computer readable recording medium may include a permanent mass storage device such as RAM (random access memory), ROM (read only memory), a disc drive, SSD (solid state drive), flash memory, and the like. Here, the permanent mass storage device such as ROM, SSD, flash memory, disk drive, and the like may be included in the electronic device 110 or the server 150 as a separate permanent storage device distinct from the memories 211, 221. Also, the memories 211, 221 may store an OS (Operating System) or at least one program code (e.g. a code for a browser installed and run in the electronic device 110 or an application installed and run in the electronic device 110 to provide a specific service). The software components may be loaded from computer-readable recording medium separate from the memories 211, 221. The separate computer-readable recording medium may include a non-transitory computer-readable recording medium such as a floppy drive, a disc, a tape, a DVD/CD-ROM drive, a memory card, and the like. In other example embodiments, the software components may be loaded to the memories 211, 221 through the communication modules 213, 223, and not through the non-transitory computer-readable recording medium. For example, at least one program may be loaded to the memories 211, 221 based on a computer program (e.g. the above described application) which is installed by files that developers or file distributing systems distributing application installation files (e.g. the above described server 160) provided through the network 170.

The processors 212, 222 may be at least one processor, or a plurality of processors, and may be configured to process computer program instructions by performing basic arithmetic, logic, and input/output operation. The instructions may be provided to the processors 212, 222 by the memories 211, 221 or the communication modules 213, 223. For example, the processors 212, 222 may be configured to execute special purpose computer readable instructions of special purpose program code corresponding to one or more of the example embodiments stored in the recording device such as the memories 211, 221, thereby transforming the processors 212, 222 into a special purpose processor for performing the methods of the example embodiments.

The communication modules 213, 223 may provide a function for communication between the electronic device 110 and the server 150 through the network 170 and provide a function for communication between the electronic device 110 and/or the server 150 with other electronic devices (e.g. the electronic device 120) or other servers (e.g. the server 160). For example, a request that the processor 212 of the electronic device 110 generates according to a program code stored in a recording device such as the memory 211 may be transmitted to the server 150 through the network 170 according to control of the communication module 213. Conversely, a control signal or an instruction, a content, a file, and the like which are provided according to control of the processor 222 of the server 150 may be received to the electronic device 110 through the communication module 213 of the electronic device 110 by going through the communication module 223 and the network 170. For example, the control signal or the instruction, the content, the file, and the like of the server 150 received through the communication module 213 may be transmitted to the processor 212 or the memory 211, and the content or the file, and the like, may be stored in the storage medium (e.g., the above described permanent storage device, etc.) that the electronic device 1 110 may further include.

The input/output interface 214 may be a means for interfacing with an input/output device 215. For example, an input device may include a device such as a keyboard, a mouse, a microphone, a camera, etc., and an output device may include a device such as a display, a speaker, a haptic feedback device, and the like. As another example, the input/output interface 214 may be a means for interfacing with a device in which an input function and an output function are integrated into a single function such as a touch screen. The input/output device 215 may be configured with the electronic device 110 as one device. Also, an input/output interface 224 of the server 150 may be a means of interfacing with a device (not illustrated) for input or output which are connected with the server 150 or the server (150) may include. As more specific example, when processing the computer program instructions loaded to the memory 211, the processor 212 of the electronic device 110 may display a service screen or content configured by using data provided by the server 150 or the electronic device 120 on the display through the input/output interface 214.

Also, in other example embodiments, the electronic device 110 and the server 150 may include more components than the components shown in FIG. 2. For example, the electronic device 110 may be implemented to include at least part of the described input/output device 215 or further include other components such as a transceiver, a GPS (Global Positioning System) module, a camera, various sensors, a database, and the like. As a more specific example, when the electronic device 110 is a smart phone, various components such as an acceleration sensor or a gyro sensor, a camera module, various physical buttons, a button using touch panel, an input/output port, a motor for vibrating, and the like, that the smart phone usually includes may be implemented to be further included in the electronic device 110.

Hereinafter, a particular example embodiment of a method, an apparatus, a system, and/or non-transitory computer readable medium for controlling user access through content analysis of an application is described, however the example embodiments are not limited thereto.

An application (e.g., software application, etc.) according to at least one example embodiment includes a function for controlling user access for the application through chat content analysis. The application may include a social media application for providing a social networking service, such as a messenger service, an instant messenger service, a timeline application, a photo sharing service, a calendar service, a videochat service, a file sharing service, an online gaming service, VoIP service, a SMS service, an email service, and/or other communication service, and the like. In the case of the messenger (e.g., messenger service), access to a chat room which is a chat related interface (e.g., graphical user interface, etc.) may be controlled through chat content analysis.

Hereinafter, some example embodiments are described using the messenger as an example, but the example embodiments are not limited thereto, and features related to the example embodiments may be applied to various applications, such as social media applications, calendars, email applications, SMS applications, video chat applications, VoIP applications, timelines, etc., other than the messenger.

A messenger service is not only used to communicate with personal relations, such as family or friends, but may also be used as a communication means for public relations, such as business purposes including work, etc.

Since in the messenger services, most chat rooms are not separated into personal space, and public space, and the chat rooms may be mixed and arranged in one list, it occurs that a person makes a mistake regarding a chat room and delivers the wrong or inappropriate contents to the chat room. Particularly, mistakes in public space may be more than a simple misunderstanding and may affect one's social reputation, employment reputation, business deals, and/or lead to restrictions, such as defamation and the like in some cases.

At least one example embodiment may provide a function for controlling access of a chat room according to a public level by understanding the public level for the chat room through chat analysis to reduce and/or prevent unintentional input mistakes of a user in a messenger.

Figure 3:
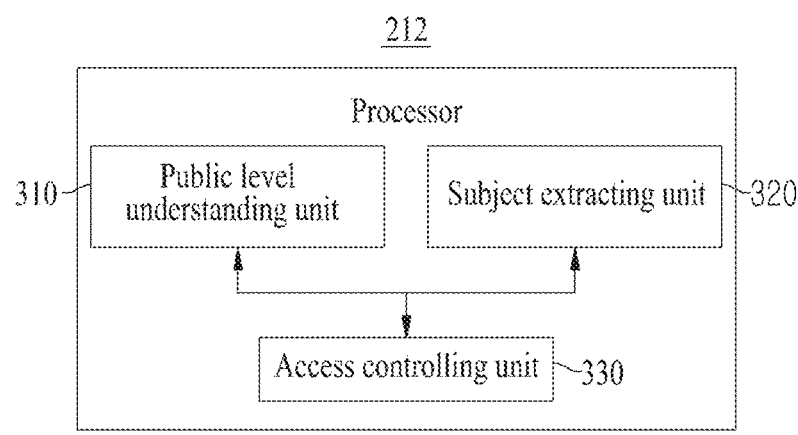
FIG. 3 illustrates an example of elements that at least one processor of an electronic device may include according to at least one example embodiment.
Figure 4:
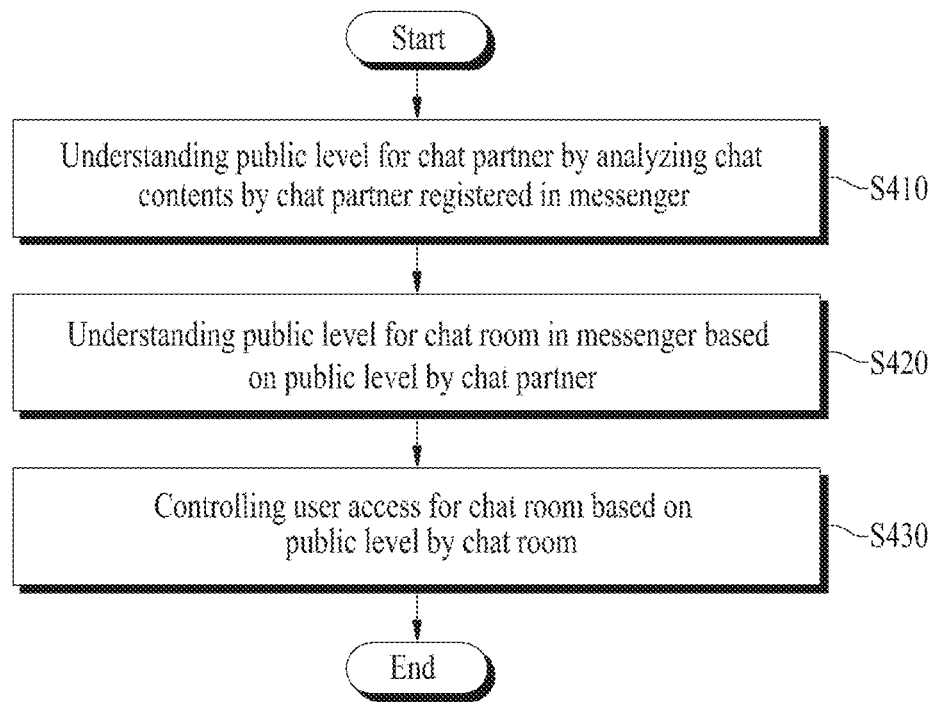
FIG. 4 is a flow chart illustrating an example of a method that an electronic device may perform according to at least one example embodiment.

FIG. 3 illustrates an example of elements that at least one processor of an electronic device may include according to at least one example embodiment, and FIG. 4 is a flow chart illustrating an example of a method that an electronic device may perform according to at least one example embodiment.

In the electronic device 110 according to at least one example embodiment, an access controlling system implemented with a computer may be configured. For example, the access controlling system may be implemented in an independently operating program form, or implemented to be able to operate on a particular application by being configured in an in-app form of the particular application, and may provide a function for controlling user access through chat analysis in a messenger service through interworking with the server 150 in some cases, but the example embodiments are not limited thereto.

The access controlling system implemented in the electronic device 110 based on instructions provided by the application installed in the electronic device 110 may perform an access controlling method. To perform an access controlling method according to FIG. 4, the processor 212 (and/or a plurality of processors) of the electronic device 110 which is as components may include a public level understanding unit 310, a subject extracting unit 320, and/or an access controlling unit 330, etc., as illustrated in FIG. 3, but is not limited thereto. According to at least one example embodiment, components of the processor 212 may be selectively included or excluded in the processor 212. Also, according to at least one example embodiment, components of the processor 212 may be divided or combined to express functions of the processors.

The processor 212 and the components of the processors 212 may control the electronic device 110 to perform steps S410 to S430 that the access controlling method of FIG. 4 includes. For example, the processor 212 and the components of the processor 212 may be implemented to execute instructions according to OS code and at least one program code that the memory 211 includes.

Here, the components of the processor 212 may be expressions of different functions of the processor 212 performed by the processor 212 according to special purpose computer readable instructions provided by the program code stored in the electronic device 110 (e.g., instructions provided by the application run in the electronic device 110) to perform the methods of at least one example embodiment, thereby transforming the processor 212 into a special purpose processor to perform the example embodiments. For example, the public level understanding unit 310 may be used as a functional expression of the processor 212 controlling the electronic device 110 according to the above described instructions such that the electronic device 110 understands a public level for a chat room.

The processor 212 may read desired and/or required instructions from the memory 211 in which instructions related to control of the electronic device 110 are loaded. In this case, the read instructions may include instructions for controlling the processor 212 to perform hereinafter described steps S410 to S430, etc.

In S410, the public level understanding unit 310 may understand (and/or determine) a public level for a chat partner by analyzing chat contents (e.g., messages, texts, emails, voice communications, etc.) exchanged between a user of the electronic device 110 and the chat partner by chat partner registered in the messenger. For example, the public level understanding unit 310 may calculate a public score according to honorific language use by extracting honorific language and/or formal language, etc., within the chat that the user has with the chat partner, but the example embodiments are not limited thereto. Here, the public level understanding unit 310 may calculate a public score by using honorific language use (and/or formal language use, etc.) frequency compared to the whole chat, honorific language importance within the chat, and the like. Also, the public level understanding unit 310 may calculate a public score by further using chat sentence length, slang use frequency, completeness of sentence, proper grammatical usage, and the like. Therefore, the public level understanding unit 310 may understand a public level indicating public relation with the chat partner by analyzing the chat contents between the user and the chat partner (e.g., the intended message recipient).

In S420, the public level understanding unit 310 may understand a public level of a chat room in the messenger based on the public level of a chat partner. The chat room may include one or more chat partners, and here, the public level understanding unit 310 may calculate a public score for a corresponding chat room by using a public score of each chat partner included in each chat room by chat room.

In S430, the access controlling unit 330 may control user access for a chat room based on the public level by chat room in the messenger. Here, the access controlling unit 330 may control sorting or displaying of chat room list of the messenger, input lock of chat room, screen display, notice display, sending words correction, content recommendation, and the like, based on the public score by chat room, but the example embodiments are not limited thereto.

Furthermore, the subject extracting unit 320 may extract the main subject of a corresponding chat room by analyzing the chat contents included in each chat room by chat room. The subject extracting unit 320 may calculate the word importance of each word within the chat contents based on the frequency of the words that appeared in the chat contents of the chat room, and find at least one main keyword. Accordingly, the access controlling unit 330 may control input of the chat room based on the extracted main subject.

Particular example embodiments of the process for calculating the public score by chat partner S410 are as follows.

The following data may be used for each chat partner in order to calculate public score, but the example embodiments are not limited thereto.

(1) Frequency of Honorific Language and its Importance in a Sentence(s)

The public level understanding unit 310 may understand the public level by analyzing how much (e.g., how often) honorific language is used, and how much the used honorific language is important in a sentence (e.g., the importance of the use of the honorific language in the sentence(s)).

Particularly, the public level understanding unit 310 may divide the phrases and words in each paragraph and/or sentence in the chat contents after dividing the paragraphs and sentences in the chat contents exchanged between the user and the chat partner through the Tokenizer.

The public understanding unit 310 may extract each morpheme in phrases and/or words divided through morpheme analysis, analysis of the parts of speech, and/or basic form analysis of Natural Language Processing, etc., but the example embodiments are not limited thereto.

The public level understanding unit 310 may understand whether each morpheme corresponds to honorific language indicating an honorific title and/or a term of respect based on honorific language corpus, honorific language morpheme, and the like, which are constructed within a dictionary database. For example, the public level understanding unit 310 may detect honorific title endings and/or honorific title nouns during analysis of the parts of speech of the text, etc. The honorific title is indicated through mainly a word (phrase), a suffix (or preposition), a prefinal ending, closing expression, and the like. In the case of English grammar, 'Sir', 'madam', and the like, used at the end of a sentence, 'Mr', 'Ms', 'Dear', and the like, used instead of name, and would, could, and the like, which are interrogative sentence auxiliary verbs, may be expression of honorific title. For example, when comparing with 'Thank', 'appreciate', 'be obliged to', and the like, may be more formal honorific language expression, and when comparing 'tell me', 'let me know' may be more formal honorific language expression.

The public level understanding unit 310 may not only extract honorific language in chat contents by using attributes indicating that a word itself falls within an honorific class provided by the dictionary database, but the public level understanding unit 310 may also analyze features related to honorific language by collecting documents with many forms of formally honorific expression, for example, diplomatic documents, corporation announcements, business documents, legal documents, news articles, and the like, and based on the big data analysis result, honorific language in chat contents may be extracted.

The public level understanding unit 310 may analyze the honorific language use frequency of extracted chat contents in comparison to the whole (e.g., entire) chat contents, and may calculate word importance of corresponding honorific language in the extracted chat contents based on the honorific language use frequency. For example, the public level understanding unit 310 may calculate the importance of honorific language within the chat contents by using TF-IDF (Term Frequency-Inverse Document Frequency) for calculating word importance within documents based on frequency and N-gram for understanding relation between words by making words existed before and after within documents to a model, etc., but the example embodiments are not limited thereto.

(2) Honorific Phrases Ratio

The public level understanding unit 310 may classify honorific phrases by analyzing chat contents in measures of phrase units, and calculate honorific phrase ratio in the chat. The public level understanding unit 310 may calculate the honorific phrase ratio compared to whole phrases of sentences by selecting honorific phrases including honorific language among phrase units in sentences, etc., but the example embodiments are not limited thereto.

(3) Sentence Length Ratio

The public level understanding unit 310 may calculate the average length of sentences in chat contents exchanged with a chat partner, and calculate the sentence length ratio compared to an average sentence length ratio of the total chat partners. Considering that as the sentences are shorter in comparison to a desired threshold, such as the average among the total chat partners, etc., the probability that chat participants have a personal relationship is higher, and on the contrary (e.g., in contrast), as the sentences are longer, the probability that they are in public relation (e.g., formal and/or business relationship, etc.) is higher, the sentence length ratio may be used to calculate a public score.

(4) Nonstandard Language Use Ratio

The public level understanding unit 310 may calculate the nonstandard language use frequency in chat contents exchanged with a chat partner by using the dictionary database, the dictionary database including nonstandard language such as abbreviations, slang, words used in one or more dialects, buzzwords, and the like, and calculate the nonstandard language use ratio compared to the average nonstandard language use ratio among the total chat partners. Considering that as nonstandard language use frequency is lower in comparison to a desired threshold, such as the average among the total chat partners, etc., the probability that the chat participants are in public relation is higher, nonstandard language use frequency may be used to calculate a public score.

(5) Sentence Completeness Ratio

The public level understanding unit 310 may calculate the use frequency of sentences having completed structure (e.g., sentence completeness ratio, complete sentence ratio, etc.) in chat contents exchanged with a chat partner, and may calculate the sentence completeness ratio compared to the average sentence completeness ratio among the total chat partners, etc. For example, Korean sentence structure is based on an arrangement order of subject-(object)-predicate, and by understanding how many sentences having completed structure are occupied in the whole chat, the relation type of the chat partner may be inferred. Considering that more personal relation represents destruction of sentence structure (e.g., less likelihood of using complete sentences, etc.), sentence completeness ratio may be used in calculating a public score.

(6) Contact Group Extra Point

The public level understanding unit 310 may assign weights (e.g., desired weights, scores, etc.) indicating a public level by analyzing the name of a contact group in which a chat partner is included among contact groups in a contact application (e.g., contact list, phone book, address book, instant messenger buddy list, social networking service contact list, etc.) of the electronic device 110. The weights according to a public level for the name of contact group generated in the contact application of the electronic device 110 may be predefined (and/or a desired weight may be applied to each contact group, etc.). For example, when the contact group in which the chat partner is registered is the name indicating a public relation, such as a company or a client, a contact group extra point (e.g., a desired weight) may be assigned for the corresponding chat partner.

(7) Short Distance Extra Point

The public level understanding unit 310 may assign weights (e.g., desired weights, scores, etc.) indicating a public level for the chat partner located around the user in a desired and/or preset public location by using short range communication (e.g., WiFi, Bluetooth, NFC, etc.) of the electronic device 110. For example, the public level understanding level 310 may assign a short distance extra point (e.g., a desired short distance weight, etc.) for a chat partner detected as staying around (e.g., being located close to) the user, detected as being located in a company location (e.g., building, store, restaurant, public venue, etc.) which is set by the user and/or otherwise designated as being a public location.

(8) Content Extra Point

The public level 310 may assign weights indicating a public level for the chat partner based on the type of content exchanged with the chat partner and/or an image object recognition result. Text tag dictionary in which a public level is defined may be pre-constructed, after recognizing objects in images of photos (e.g., images, GIFS, stickers, emojis, etc.) and/or videos exchanged with the chat partner based on the dictionary, a content extra point (e.g., a desired content weight, score, etc.) may be assigned according to a public level corresponding to a relevant tag for the text tag (e.g., comments associated with the image/video, HTML tags, XML tags, etc.) of the recognized object. Also, as the proportion of a particular type of contents among contents exchanged with the chat partner, for example, screen shots, and/or documents, etc., is larger, it is likely to be a public relation, so the content extra point(s) may be assigned for the chat partner according to the proportion of the corresponding contents.

The public level understanding unit 310 may calculate a first public score for a chat partner by using (1) the frequency of honorific language and its importance in a sentence among the above described data.

The first public score may be defined as Equation 1.

$$1_{st}\text{Score}_x = \frac{\sum_{i=0}^{n}(s_i \times w_i)}{N} \quad \text{[Equation 1]}$$

Here, $1_{st}\text{Score}_x$ represents a first public score for a chat partner x, s represents a score assigned to each morpheme corresponding to honorific language, w represents a weight assigned to the importance of each morpheme corresponding to honorific language, and N represents the total number of chats.

Furthermore, the public level understanding unit 310 may calculate a final public score for a chat partner by further using additional criterion to calculate the final public score, the additional criterion including at least one among (2) honorific phrases ratio, (3) sentence length ratio, (4) nonstandard language use ratio, (5) sentence completeness ratio, (6) contact group extra point, (7) short distance extra point, and (8) content extra point, etc., but the example embodiments are not limited thereto.

For example, the final public score may be defined as Equation 2.

$$\text{score}_x = 1_{st}\text{Score}_x \times R_p \times R_l \times R_s \times R_c + w_c + w_p + w_i \quad \text{[Equation 2]}$$

Here, $\text{Score}_x$ represents a final public score for a chat partner x, $R_p$ represents honorific phase ratio, $R_l$ represents sentence length ratio, $R_s$ represents nonstandard language use ratio, $R_c$ represents sentence completeness ratio, $w_c$ represents contact group extra point, $w_p$ represents short distance extra point, and $w_i$ represents content extra point.

In addition, the public level understanding unit 310 may calculate the confidence for a public score for a chat partner by using the number of chats and chat frequency, etc., and for example, the confidence may be calculated through Equation 3.

$$\text{Confidence}_n = f(\text{number of total chats}) \times \left\{\frac{\text{average number of chats a day}_n}{\text{average number of total chats a day}}\right\} \quad \text{[Equation 3]}$$

Here, $\text{Confidence}_n$ which represents a confidence score (e.g., confidence level, etc.) for a public score of a chat partner n may be calculated with the average number of chats a day exchanged with the chat partner n compared to the average number of total chats a day exchanged with the total chat partners.

The desired and/or required minimum number of chats may be set for calculating confidence for a public score of a chat partner, and confidence function based on the minimum number of chats is as follows.

$$f(x) = \begin{cases} 0, & x < a \\ 1, & x \geq a \end{cases}$$

Here, a represents minimum number of chats.

If the public score of the chat partner has a confidence score that is below a threshold, the public score may be invalidated, and the public score of the chat partner with a confidence score that is above the threshold, may be valid and/or guaranteed, and may be used in calculating a public score by chat room as effective data. As another example, graded weights may be assigned for the public score of the chat partner according to the confidence score (e.g., confidence level, etc.), which may be used in calculating a public score by chat room.

The process for calculating a public score based on chat contents is described above, and a method for calculating a public score of a chat partner who has no chat content with a user (e.g., the user has not chatted with and/or communicated with a chat partner, etc.) is as follows.

The public level understanding unit 310 may predict a public score for a chat partner through relation analysis by acquiring a social graph related to a user from the server 150. For this, the public level understanding unit 310 may acquire a social graph between people formed within a messenger service, social networking service, etc., and chat frequency from a server 150, and then, connect relations between the people with edges (e.g., connect links between the people represented by the graph) and form a network graph of friendship which sets the chat frequency as weights of the edge. Here, the public level understanding unit 310 may cluster the friendship within the network graph, and then, estimate, for example, the average value and/or the median value of a public score of the friends in a cluster as a public score for a corresponding chat partner from the public score of friends included in the corresponding cluster for the cluster in which a chat partner having no chat content with the user is included.

Similarly, in case of the chat partner having no chat content with the user, at least one of (6) contact group extra point (e.g., desired contact group weight) and (7) short distance extra point (e.g., desired short distance weight) among the above described data may be additionally reflected to the public score.

Particular example embodiments of a process for calculating a public score by chat room S420 are as follows.

The public level understanding unit 310 may calculate a public score of a corresponding chat room by using a public score of a chat partner included in each chat room by chat room when calculating a public score for each chat partner registered in a messenger service, social networking service, etc., is completed.

For example, the public score of chat room may be defined as Equation 4.

$$Score_x = \frac{\sum_i (S_i \times R_i)}{N_x}$$

Here, $Score_x$ represents a public score for chat room x, $S_i$ represents a public score for a chat partner i, $R_i$ represents ratio of the number of chats of the chat partner i, and $N_x$ represents the number of people included in the chat room x.

$R_i$ is the same with $R_i=\{$(number of chats by i+$CI_i$/ (number of total chats in chat room)$\}$, $CI_i$ represents the number of times that the chat partner i starts the chat.

A process for extracting a main subject by chat room is as follows.

The subject extracting unit 320 may extract text and/or images in chat contents exchanged in a chat room. Here, the subject extracting unit 320 may extract text and/or images in a clipboard used in a chat room and/or extract text and images in webpage contents of a corresponding URL by prefetching the URL shared through the chat room.

The subject extracting unit 320 may divide phrases and words in each paragraphs and/or sentences after separating the paragraphs and/or sentences in chat contents through the Tokenizer, and then, may extract each morpheme through morpheme analysis, basic form analysis, analysis of parts of speech, and the like, according to Natural Language Processing, and may extract text tags of objects included in images through image object recognition in case of images, etc.

The subject extracting unit 320 may select at least one main subject in each morpheme extracted from the chat contents through TF-IDF and N-gram analysis, etc. The subject extracting unit 320 may find keywords with high importance among nouns or pronouns frequently appeared by using TF-IDF for calculating the word importance in documents based on frequency and N-gram analysis for understanding relation between adjacent words.

Therefore, the subject extracting unit 320 may extract the main subject related to a corresponding chat room (e.g., the main subject/topic of a chat room) through chat content analysis of each chat room by chat room (e.g., each chat room of a plurality of chat rooms, etc.). The main subject by chat room is available to control user access for a corresponding chat room (e.g., allow or prohibit a user from accessing a chat room).

In the above, the electronic device performs the process for understanding public level S410 to S420 and the process for extracting main subject based on instructions provided by the application installed in the electronic device 110, but it is not limited thereto, and according to at least one example embodiment, the server 150 may directly perform the above-described processes by interlocking the application installed in the electronic device 110.

Particularly, the processor 222 of the server 150 may include a public level understanding unit and/or a subject extracting unit, etc., in order that the server 150 performs a part of the method for access control according to FIG. 4, but is not limited thereto. According to at least one example embodiment, the components of the processor 222 may be selectively included or excluded in the processor 222. Also, according to at least one example embodiment, the components of the processor 222 may be divided or combined to express functions of the processor 222.

The processor 222 and the components of the processor 222 may control the server 150 to perform the process for understanding public level S410 to S420 and/or the process for extracting main subject, but are not limited thereto. For example, the processor 222 and the components of the processor 222 may be implemented to execute computer readable instructions according to OS code and at least one special purpose program code (e.g., computer readable instructions) included in the memory 221 corresponding to, for example, the process for understanding public level and/or the process for extracting main subject, etc., thereby transforming the processor 222 into a special purpose processor.

The public level understanding unit and/or the subject extracting unit included in the processor 222 of the server 150 performs the process for understanding public level S410 to S420 and/or the process for extracting main subject as the same with or as corresponding to the public level understanding unit 310 and/or the subject extracting unit 320 described through FIG. 3, so particular description for the components of the processor 222 is omitted.

In other words, the public score calculation and/or main subject extraction is performed in the electronic device 110, and it is also possible to performed the public score calculation and/or main subject extraction in the server 150, and to provide the result value to the electronic device 110. When the public score calculation and/or main subject extraction is performed in the electronic device 110, information which may not be acquired in the electronic device 110 in some cases may be requested and transmitted to the server 150, and the corresponding processes may be performed. As another example, the electronic device 110 may calculate a public score by chat partner in a messenger and upload it to the server 150, and accordingly, the server 150 maintains the public score by chat partner for each user using the messenger service, and may provide the public score by chat partner in friendship with a user to a corresponding electronic device when a request is made.

Particular example embodiments of a process for controlling user access for a chat room are as follows.

Figure 5:
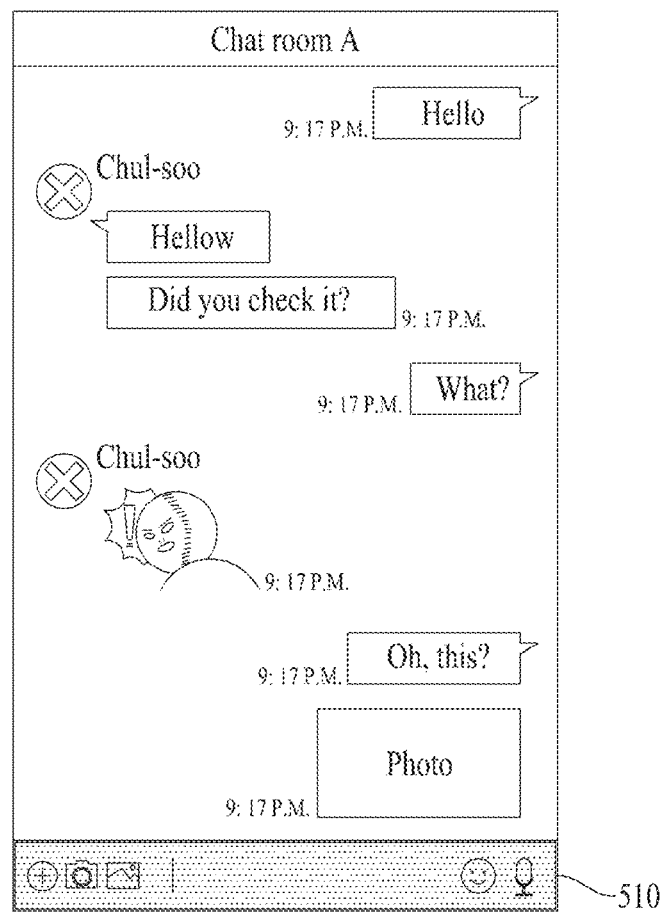
FIGS. 5 to 11 illustrate various examples of controlling user access according to public score of chat room according to at least one example embodiment.

For example, the access controlling unit 330 may automatically apply a lock setting for an input tool of a corresponding chat room when a public score is above a public score threshold (e.g., a desired threshold) based on a public score of a chat room for each chat room. Referring to FIG. 5, when entering a chat room 500 in which a public score is above a threshold, inactive window 510 inactivating the input tool may be overlaid on the input tool including chat input window and displayed, or in other words, the graphical user interface (GUI) of the chat application may be modified to include the input tool based on the results of the public score of the chat room and the desired threshold, and the modified GUI is displayed. The inactive window 510 may be overlaid on the input tool in the chat room 500 so that all input including simple text input, and such as photos, videos, emoticons (stickers), and the like, are unable. According to a request for unlocking of a user in a state where a lock is set in the chat room 500, for example, when long touching (and/or other gesture operation, user input operation, etc.) the inactive window 510 for a certain time, the inactive window 510 is removed and/or disappears and the use of the input tool is allowed.

As another example, the access controlling unit 330 may selectively set whether or not to lock each chat room according to user setting, and here, a chat room in which a public score is above a desired threshold may be recommended as a chat room for the input lock setting among chat rooms of the messenger in the user setting process.

Figure 6:
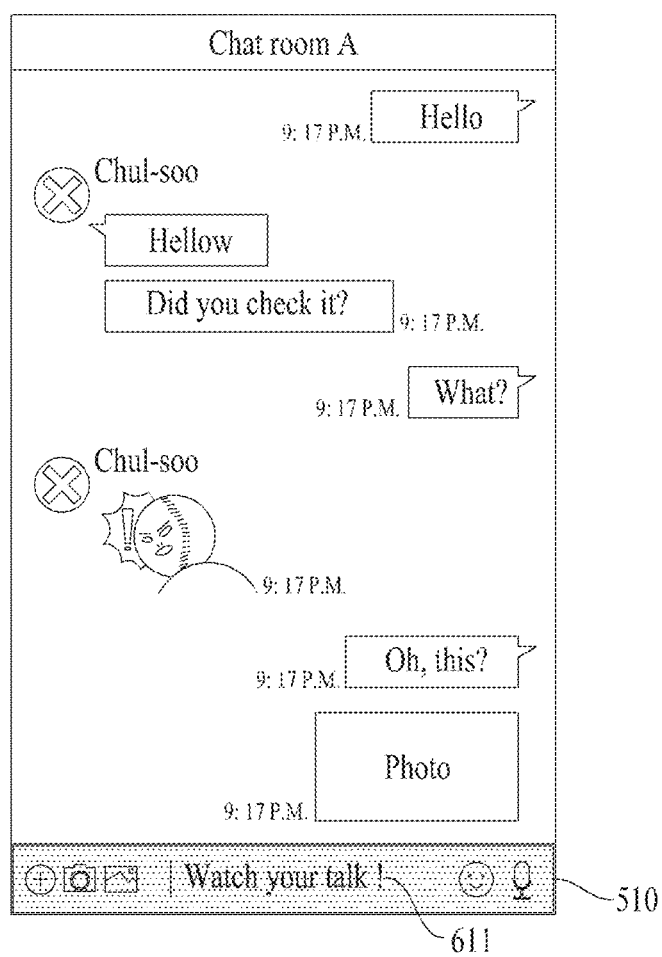

As another example, as illustrated in FIG. 6, when entering the chat room 500 in which a public score is above a desired threshold, the access controlling unit 330 may simultaneously overlay (e.g., modify the GUI of the chat application, etc.) and display the inactive window 510 to the input tool in the corresponding chat room 500 and display at least one guidance information 611 among sentences and images indicating public relation on the inactive window 510. Information for public relation may be provided by adding guidance information 611 to the inactive window 510. The guidance information 611 may be set with particular sentences or images that a user wants, and collectively set for all chat rooms where the public score is above the desired threshold or individually set for each chat room. Chat room rating may be divided based on the public score in some case, and here, it is also possible that the guidance information 611 is set for each rating.

Figure 7:
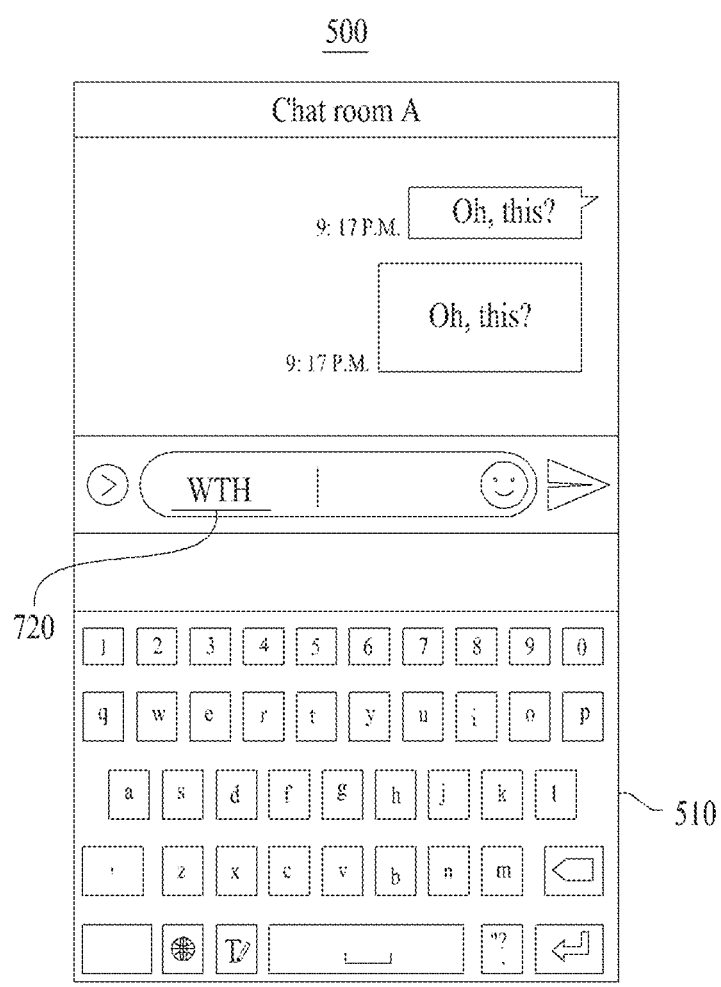

As another example, when a public score is above a threshold based on a public score of a chat room, the access controlling unit 330 may highlight sentences input into the corresponding chat room (e.g., input into the corresponding chat room GUI) and autocorrect corresponding sentences. Referring to FIG. 7, when text is input in chat input window of the chat room 500 in which the public score is above the threshold, the access controlling unit 330 may apply highlight elements (e.g. red underline, bold, emphasis, and/or other GUI elements, etc.) 720 to corresponding sentences if the input text includes nonstandard language such as abbreviations, slang, a dialect, a buzzword or misspelled sentences. Beside the highlight elements, a send button may be changed to different color and/or image from the original, or a pop-up requesting for reconfirming sentences before sending text may be provided when inputting send button. Also, when name of a chat partner included in the chat room 500 is input in the chat input window, the access controlling unit 330 may automatically add and input an honorific title (e.g., 'Mr', 'Ms.', 'Dr.', 'PhD', 'MS', 'Jr.', 'Sr.', and the like) before or after the name. In addition, when title is input by using mention function in the chat input window of the chat room 500, the access controlling unit 330 may apply highlight elements to a corresponding title, change send button to different color or image from the original, or provide a pop-up requesting for reconfirming titles before sending when inputting send button if it is determined that chat partner of the corresponding title is existed in the chat room 500, and it is not existed.

As another example, the access controlling unit 330 may provide a notice for contents to be shared through a corresponding chat room when a public score is above a threshold based on a public score of a chat room. Here, the access controlling unit 330 may display a warning screen when sharing, for example, photos, videos, text (clipboard), URL, and the like, through the chat room where the public score is above the threshold. Also, the access controlling unit 330 may analyze contents to be shared through the chat room where the public score is above the threshold, and may display a warning screen when the analysis result has low correlation with the main subject of the chat room. For example, after analyzing a webpage corresponding to a URL that the user intends to share with a chat room, for example by acquiring title and lead of a webpage, and the like, by prefetching webpage contents of URL, a pop-up requesting reconfirmation that the user intended to share the webpage URL may be provided when correlation is low between the compared to main subject of the chat room. Reconfirmation may be requested through a pop-up for contents having low correlation with the existing chat subject of the chat room when sharing photos for playing in the water or food photos and the like in the chat room in which only documents or screen shots are existed, when sharing travel information URL or clip board including travel review text in the chat room where contents related to business is a main subject, and the like.

As another example, the access controlling unit 330 may recommend contents for expression of opinions according to a public score of a corresponding chat room through the chat room. The contents for expression of opinion are hieroglyphs used to express a user's feelings or though and the like and, for example, emoticons, stickers, and the like, may correspond to these, and rating for a public score may be assigned. Here, the access controlling unit 330 may recommend emoticons and/or stickers of a rating corresponding to the public score of the chat room for each chat room. Also, according to the public score of the chat room, it is possible to set a set of contents for expression of opinion that a user desires and/or preferentially wants to use, and arrange or recommend the set which is set by the user to desirably and/or preferentially be used in a real chat room.

As another example, the access controlling unit 330 may generate chat partner groups according to relations in a chat partner list based on a public score of a chat partner, but is not limited thereto. Here, the access controlling unit 330 may sort the chat partner list in descending order or ascending order based on the public score of the chat partner, and display it. In addition, the access controlling unit 330 may generate chat partners whose public score is above a desired threshold as a public chat group, and generate chat partners whose public score is below the desired threshold as a personal chat group. Rating of the chat partners may be divided based on the public score in some case, and here, it is also possible to generate the chat partner group by rating of the chat partner.

As another example, the access controlling unit 330 may provide a notice regarding the current chat room related to a chat room change event if the public score change between the current chat room and the previous chat room is above a certain level (e.g., a desired threshold) when changing the chat room. Since mistakes occur a lot when changing from a chat room of a personal relation to a chat room of a public relation, it is possible to detect when the public score of the chat room is greatly different as chat room changing monitoring. The access controlling unit 330 may occur chat room change event by detecting when $$\frac{\text{Score}_{current} - \text{Score}_{previous}}{\text{Score}_{max} - \text{Score}_{min}} > \alpha$$

Figure 8:
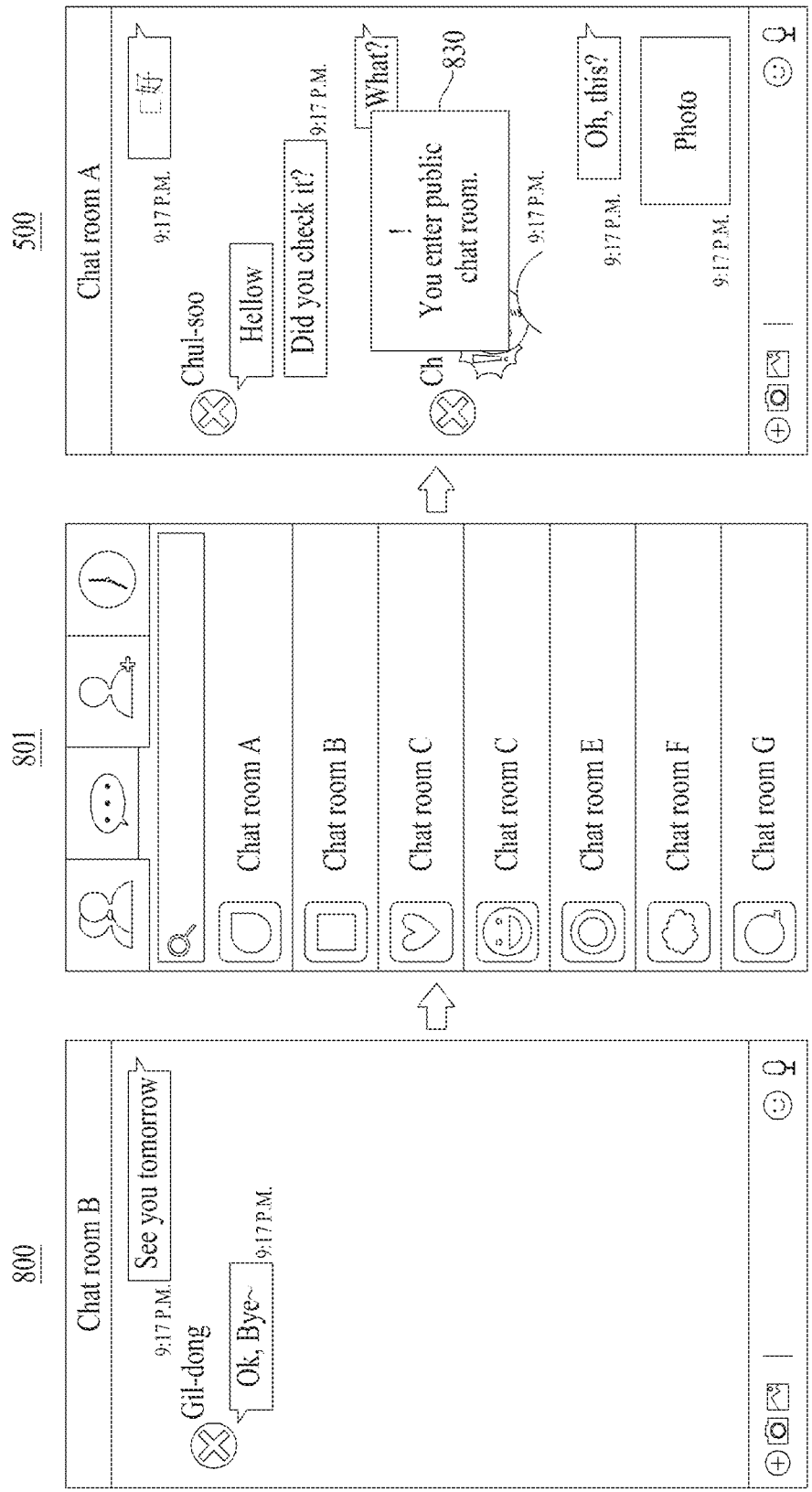

(here, $\text{Score}_{min}$ represents the smallest public score, $\text{Score}_{max}$ represents the biggest public score, $\alpha$ is a setting value indicating changing sensitivity as a value from 0 to 1. Referring to FIG. 8, at the point of using a personal chat room 800 where a public score is below a desired threshold and selecting and entering another chat room 500 in a chat room list, when a public score change between the current entered chat room 500 and the previous chat room 800 is above a certain level (e.g., a desired public score change threshold), a warning window 830 indicating entering to a public chat room may be displayed in the current entered chat room 500.

Figure 9:
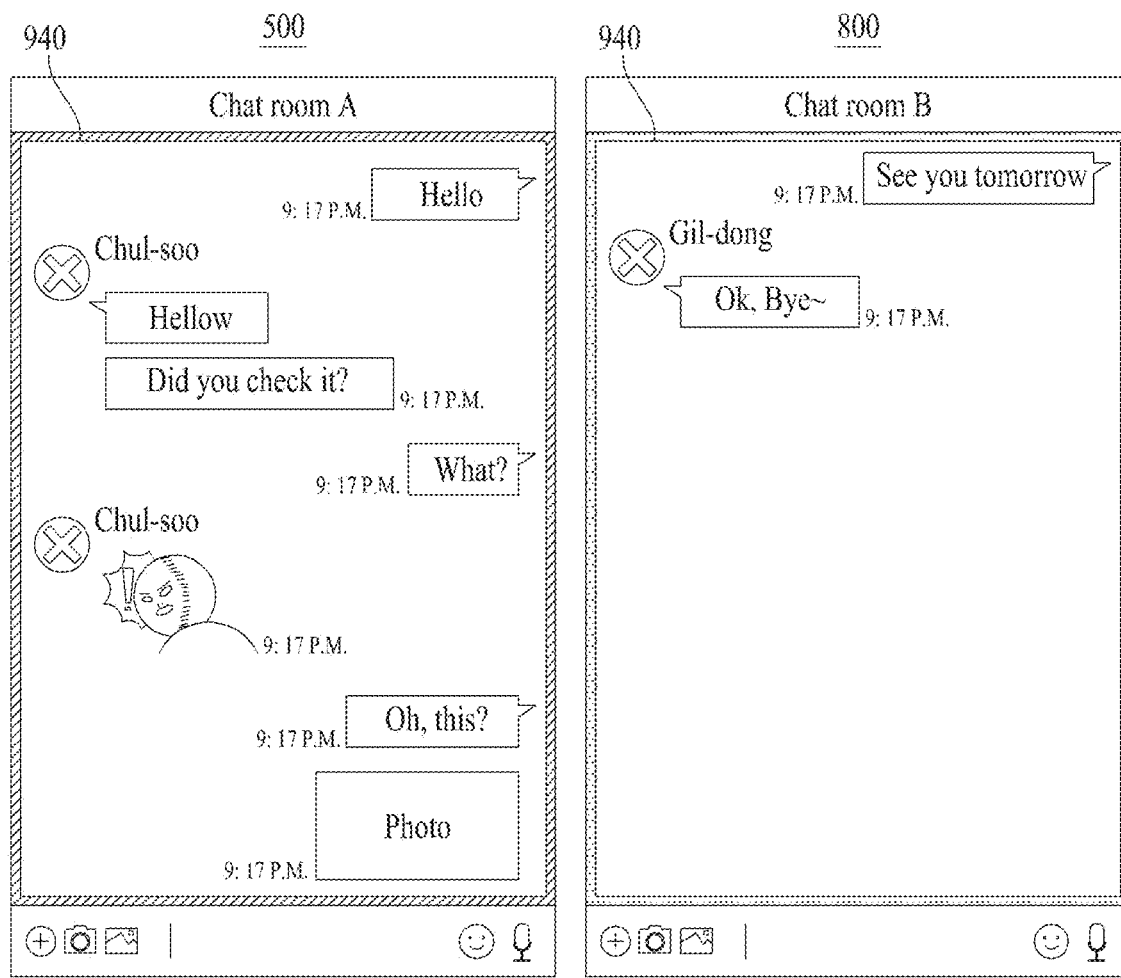

As another example, the access controlling unit 330 may differently apply and display the display elements of a chat room (e.g., the display elements of the chat room GUI, etc.) according to a public score based on a public score of a chat room. For example, as illustrated in FIG. 9, frame color 940 of the chat room 500 where the public score is above the threshold and the chat room 800 where the public score is below the threshold may be differently displayed, but the example embodiments are not limited thereto. The frame color of the chat rooms 500, 800 is set to the same with or similar to the background color as the public score is lower, while it may be set to complementary color of the background color as the public score is higher. The public level of the current chat room may be naturally and easily understood through display elements differently displayed according to the public score when moving the chat rooms 500, 800.

As another example, the access controlling unit 330 may sort a chat room list based on a public score. In other words, the access controlling unit 330 may sort the chat room list in descending order or ascending order according to the public score and display it. Or, the access controlling unit 330 may divide the chat room list into a plurality of rating (e.g., high, intermediate, low) based on the public score, and group and show the chat room list by rating and.

Figure 10:
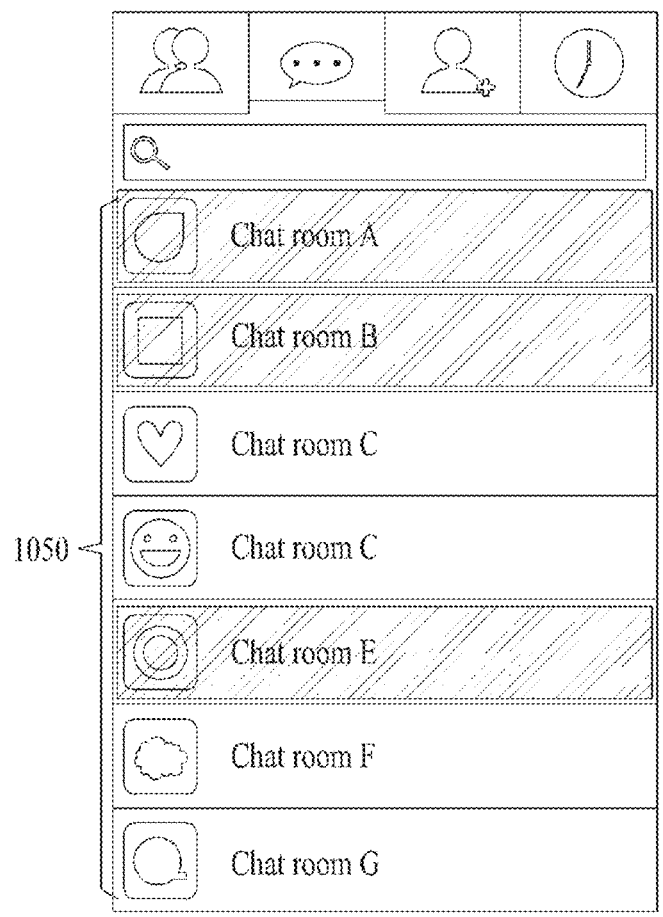

As another example, the access controlling unit 330 may differently apply display elements of items indicating each chat room in a chat list according to a public score, and display it. For example, referring to FIG. 10, background color of a corresponding item may be displayed in dark as a public score of the chat room is higher in a chat room list 1050. Or, background color of a corresponding item for a chat room where a public score is above a threshold in the chat room list 1050 may be differently displayed from other chat rooms, or a separate icon may be displayed on item of a chat room where a public score is above a threshold.

Figure 11:
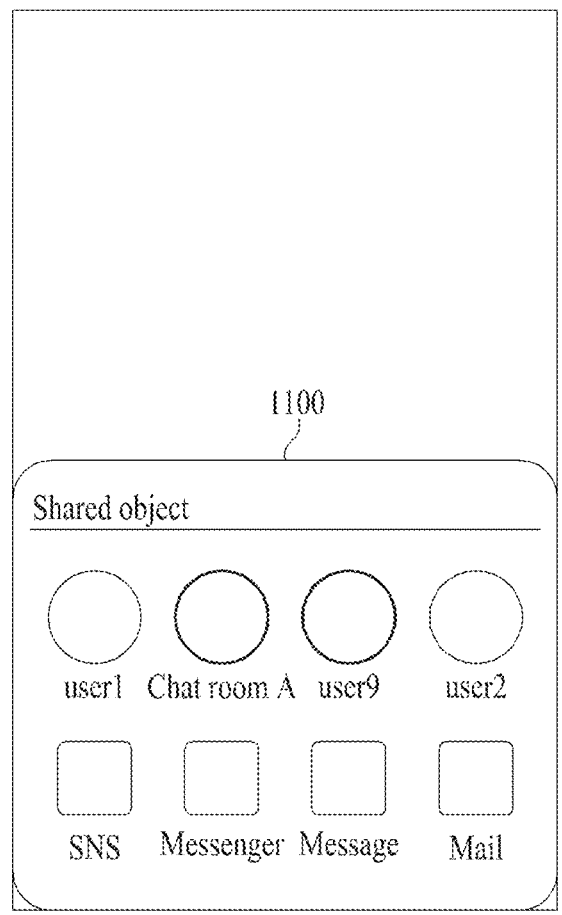

As another example, the access controlling unit 330 may differently divide chat partners or chat rooms included in a shared object list from other shared objects according to a public score and display it when sharing contents, such as photos, videos, links, and the like, with a messenger, etc. For example, referring to FIG. 11, when a shared object list 1100 for sharing contents is displayed, items related to a chat partner or a chat room in which a public score is above a desired threshold may be highlighted and displayed with a different color or displayed with a separate icon among chat partners or chat rooms of the messenger included in the shared object list 1100.

Controlling user access with the same method when the public score of chat room is above the desired threshold is described, but it is not limited thereto, and it is also possible to control user access with a method dividing rating of chat partners or chat rooms according to the public score and grading by rating.

Accordingly, public level for each chat partner and chat room may be understood by analyzing chat contents, and according to the public level, user access for the chat room such as sorting or displaying a chat room list of a messenger, input lock of chat room, screen display, notice display, sending sentence correction, contents recommendation, and the like, may be controlled according to the public level.

The units described herein may be implemented using hardware components, and/or a combination of hardware components and software components. For example, a processing device may be implemented using one or more general-purpose computers loaded with, and executing, special purpose instructions, and/or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While certain example embodiments and implementations have been described herein, other example embodiments and modifications will be apparent from this description. Accordingly, the example embodiments are not limited to such embodiments, but rather to the broader scope of the presented claims and various obvious modifications and equivalent arrangements.

What is claimed is:

1. A method executed in a computer system, the computer system comprising at least one processor configured to execute computer readable instructions included in a memory, wherein the method comprises:
   receiving, using the at least one processor, chat contents related to a plurality of chat rooms in a chat application;
   analyzing, using the at least one processor, the chat contents corresponding to a plurality of users registered in the chat application,
   determining a user public level score for each user participating in a chat room of a plurality of chat rooms of the chat application based on a result of analyzing the chat content with regard to each of the plurality of users;
   determining, using the at least one processor, a public level of each chat room of the plurality of chat rooms using user public level scores of users included in each of the chat rooms; and
   controlling, using the at least one processor, user access of a graphical user interface (GUI) of the chat application based on the determined public level score for each user, the controlling including modifying a GUI corresponding to each of the plurality of chat rooms based on the determined user public level score for each user of each chat room of the plurality of chat rooms,
   wherein the controlling comprises automatically setting a deactivating lock on an input tool of the GUI of the chat room based on the public level of the chat room.

2. The method of claim 1, wherein the analyzing comprises extracting honorific language from the chat contents of each of the plurality of chat rooms using a dictionary database, the dictionary database including an honorific language corpus, or honorific expressions determined based on big data analysis of a plurality of documents.

3. The method of claim 1, wherein the analyzing comprises:
   acquiring a social graph related to the chat application, the social graph including a plurality of users of the chat application, the plurality of users including users without chat contents; and
   predicting a public level of a corresponding chat partner of at least one chat room of the plurality of chat rooms based on relation analysis of the social graph.

4. The method of claim 1, further comprising:
   calculating, using the at least one processor, a confidence score based on the user public level score of at least one user of the chat room based on a number of total chat messages and chat frequency for each of the at least one user of the chat room; and
   the determining the public level for each chat room includes determining the public level for each chat room based on a public level of at least one user in the chat room whose confidence score is above a desired threshold among the users in the chat room, or by assigning weights according to the confidence score for the public level of the at least one user in the chat room.

5. The method of claim 1, wherein the controlling comprises sorting a chat partner list or generating a chat partner group based on the user public level score for each user.

6. The method of claim 1, wherein the controlling comprises:
   overlaying an inactivation window on an input tool of the GUI of the chat room based on the public level of the chat room, the inactivation window deactivating the input tool; and
   displaying guidance information on the inactivation window, the guidance information related to a public relation of the users of the chat room.

7. The method of claim 1, wherein the controlling comprises highlighting or autocorrecting words input in the GUI of the chat room based on the public level of the chat room.

8. The method of claim 1, wherein the controlling comprises:
   receiving a user input corresponding to a content share operation; and
   displaying a notification regarding contents to be shared by the content share operation based on the public level of the chat room.

9. The method of claim 1, wherein the controlling comprises recommending an emoticon or a sticker corresponding to the public level of the chat room through the GUI of the chat room.

10. The method of claim 1, wherein the controlling comprises:
    determining a public level change score between a public level of a current chat room of a user and a public level of a previous chat room of the user; and
    displaying a notification to the current chat room in response to the public level score change being above a desired change level score when displaying the current chat room.

11. The method of claim 1, wherein the controlling comprises displaying different display elements corresponding to the chat room based on the public level of the chat room.

12. The method of claim 1, wherein the controlling comprises sorting a chat room list, or grouping and displaying the plurality of chat rooms based on the public level of the plurality of chat rooms.

13. The method of claim 1, wherein the controlling comprises:
displaying a shared object list GUI in the GUI of the chat application, the displaying the shared object list GUI including separating a user or a chat room included in the shared object list based on the public level of the user or the public level of the chat room, the shared object list GUI including objects to be shared between the chat application and a second application.

14. The method of claim 1, further comprising:
analyzing, using the at least one processor, the chat contents of at least one chat room of the plurality of chat rooms;
extracting, using the at least one processor, at least one main subject of the at least one chat room based on the analyzing the chat contents of the at least one chat room; and
analyzing, using the at least one processor, chat content input by the user into the GUI of the chat room,
wherein the controlling comprises displaying a notification on the GUI of the chat room based on the extracted at least one main subject of the chat room and results of the analyzing the chat contents input by the user.

15. The method of claim 1, wherein the analyzing comprises:
calculating a frequency of honorific language extracted from the chat contents;
calculating an importance score of the extracted honorific language in relation to the extracted honorific language use in a sentence; and
calculating a public score of the chat contents based on the calculated frequency of the honorific language and the calculated importance score.

16. The method of claim 15, wherein the calculating the public score comprises:
calculating the public score based on at least one of average sentence length of the chat contents, frequency of use of nonstandard language of the chat contents, completion of sentence structure of the chat contents, or combinations thereof.

17. The method of claim 15, wherein the calculating the public score comprises:
calculating the public score based on weights assigned to a contact group name in which the user is included, short range communication with the user, and contents shared with the user.

18. A computer system comprising:
a memory; and
at least one processor which is connected with the memory, and configured to execute computer readable instructions to,
receive chat contents related to a plurality of chat rooms in a chat application,
analyze the chat contents corresponding to each user of a plurality of users registered in the chat application,
determine a user public level score for each user participating in a chat room of a plurality of chat rooms of the chat application based on a result of analyzing the chat content with regard to each of the plurality of users,
determine a chat room public level score for each chat room of the plurality of chat rooms based on the determined user public level scores of users included in each of the chat rooms, and
control user access of a graphical user interface (GUI) for each of the chat rooms based on the determined chat room public level score for the chat room, the controlling including modifying the GUI corresponding to each of the plurality of chat rooms,
wherein the at least one processor is further configured to automatically set a deactivating lock on an input tool of the GUI of the chat room based on the public level of the chat room.

* * * * *